UNITED STATES PATENT OFFICE.

ABRAHAM HART, OF BROOKLYN, NEW YORK.

CRAYON.

SPECIFICATION forming part of Letters Patent No. 418,947, dated January 7, 1890.

Application filed August 24, 1889. Serial No. 321,884. (No specimens.)

*To all whom it may concern:*

Be it known that I, ABRAHAM HART, of Brooklyn, in the county of Kings and State of New York, have invented a new and Improved Crayon, of which the following is a full, clear, and exact description.

This invention consists in a crayon formed as hereinafter described and claimed.

The invention has for its object to provide a crayon by means of which any fabric or substance may be marked with a well-defined mark, and also has for its object to provide a crayon which will not be affected either by a warm temperature or by the heat of the hand.

My crayon consists of the following ingredients, combined in the proportions stated: Carnauba-wax, one pound; stearic acid, one pound; paraffine-wax, one and one-fourth pound, and sufficient coloring-pigment to give to the mixture a desired color. These ingredients, in about the proportions mentioned, are melted and mixed together and the melted mixture poured into molds. The mixture hardens directly upon being poured into the molds.

The employment of the carnauba-wax renders the crayon hard. The stearic acid softens the carnauba-wax, which is naturally very hard. The carnauba-wax and stearic acid mixed together alone will give a slight mark. The addition of the paraffine somewhat softens the mixture of the stearic acid and carnauba-wax, and enables the crayon composed of the mixture to make a better and heavier mark.

The carnauba-wax and the paraffine in the mixture toughen the crayon and prevent it from becoming soft in a warm atmosphere or from the heat of the hand. This softening of the crayon in crayons made with wax has been found to be a great objection heretofore, quantities of crayon in stock softening in a warm atmosphere.

This crayon is equally efficacious in marking coarse and fine fabrics, and may be used on all kinds of materials. While it will mark without a pigment, different-colored pigments may be used to give a distinguishing color to the crayon.

The exact proportions named of the ingredients may not be strictly adhered to, but may be varied according to the judgment of the manufacturer, as he desires the crayon to make a light or heavier mark, more paraffine-wax being added if a softer crayon is desired, or more carnauba-wax being added if the crayon is to be harder.

Having thus fully described my invention, I claim as new and desire to secure by Letters Patent—

A crayon composed of a pigment and carnauba-wax, stearic acid, and paraffine-wax, in the proportions substantially as described.

ABRAHAM HART.

Witnesses:
 EDWARD W. CADY,
 C. SEDGWICK.